US010790914B2

(12) United States Patent
Ochi et al.

(10) Patent No.: US 10,790,914 B2
(45) Date of Patent: Sep. 29, 2020

(54) ACOUSTIC COMMUNICATION METHOD AND ACOUSTIC COMMUNICATION SYSTEM

(71) Applicant: Japan Agency for Marine-Earth Science and Technology, Yokosuka-shi, Kanagawa (JP)

(72) Inventors: Hiroshi Ochi, Yokosuka (JP); Takuya Shimura, Yokosuka (JP); Yoshitaka Watanabe, Yokosuka (JP); Mitsuyasu Deguchi, Yokosuka (JP)

(73) Assignee: JAPAN AGENCY FOR MARINE-EARTH SCIENCE AND TECHNOLOGY, Yokosuka-Shi (JP)

( * ) Notice: Subject to any disclaimer, the term of this patent is extended or adjusted under 35 U.S.C. 154(b) by 426 days.

(21) Appl. No.: 15/704,709

(22) Filed: Sep. 14, 2017

(65) Prior Publication Data
US 2018/0083731 A1 Mar. 22, 2018

(30) Foreign Application Priority Data
Sep. 16, 2016 (JP) ................................ 2016-182011

(51) Int. Cl.
| | | |
|---|---|---|
| H04B 11/00 | (2006.01) | |
| G08C 23/02 | (2006.01) | |
| H04B 13/02 | (2006.01) | |

(52) U.S. Cl.
CPC ............. *H04B 11/00* (2013.01); *G08C 23/02* (2013.01); *H04B 13/02* (2013.01)

(58) Field of Classification Search
CPC ......... H04B 11/00; H04B 13/02; G08C 23/02
See application file for complete search history.

(56) References Cited

U.S. PATENT DOCUMENTS

| | | | | |
|---|---|---|---|---|
| 5,433,736 A | * | 7/1995 | Nilsson | H04B 11/00 607/59 |
| 6,747,916 B1 | * | 6/2004 | Fleury | H04B 11/00 310/311 |

(Continued)

FOREIGN PATENT DOCUMENTS

| | | |
|---|---|---|
| EP | 2922222 A1 | 9/2015 |
| GB | 2518012 A | 3/2015 |

(Continued)

OTHER PUBLICATIONS

European Search Report dated Feb. 16, 2018, 4 pages.

*Primary Examiner* — Ian J Lobo
(74) *Attorney, Agent, or Firm* — Rankin, Hill & Clark LLP

(57) ABSTRACT

An acoustic communication system includes a first acoustic communication apparatus and a second acoustic communication apparatus. The first acoustic communication apparatus transmits a first acoustic wave to the second acoustic communication apparatus. The second acoustic communication apparatus transmits, as a response, a second acoustic wave to the first acoustic communication apparatus continuously in constant cycles until a next first acoustic wave is received. Each cycle includes a transmission period and a pause period. The first acoustic communication apparatus, which has received the second acoustic wave, determines a transmission timing that allows the next first acoustic wave to be received by the second acoustic communication apparatus based on a time period required from transmission of the first acoustic wave till reception of the second acoustic wave and the length of the transmission period, and transmits the next first acoustic wave to the second acoustic communication apparatus at the determined transmission timing.

16 Claims, 4 Drawing Sheets

(56) References Cited

U.S. PATENT DOCUMENTS

2005/0254344 A1* 11/2005 Barras .................... H04B 11/00
  367/76
2013/0234824 A1* 9/2013 Lozovsky .............. H04B 11/00
  340/4.3

FOREIGN PATENT DOCUMENTS

| JP | 3-245626 | 11/1991 |
| JP | 2009-227086 | 10/2009 |

* cited by examiner

ACOUSTIC COMMUNICATION METHOD AND ACOUSTIC COMMUNICATION SYSTEM

TECHNICAL FIELD

The present invention relates to an acoustic communication method and an acoustic communication system that perform acoustic communications without causing collision of acoustic waves between two acoustic communication apparatuses.

BACKGROUND ART

Wireless data communications in which acoustic waves are utilized and which are called acoustic wave communications or acoustic communications (hereinafter referred to as "acoustic communications") have been developed. While radio waves can be propagated even in vacuum where no medium is provided, a medium is required for acoustic waves to be propagated. Therefore, acoustic communications are performed using air as the medium on the ground, and using water as the medium underwater. Since radio waves are significantly attenuated underwater, acoustic communications are often performed for underwater wireless data communications.

Herein, the "acoustic waves" generally refer to compression waves (elastic waves) that propagate through a medium and include not only acoustic waves in the audible range but also ultrasonic waves, etc. in the non-audible range.

Seabed exploration systems that use a mother ship and an autonomous underwater vehicle (AUV) utilize acoustic communications (as disclosed in JP 2009-227086 A). A seabed exploration system described in JP 2009-227086 A includes a set of positioning apparatuses (a relative positioning section 11 and a signal transmission section 21) configured to position or measure the position of the AUV and a set of communication apparatuses (a first communication section 13 and a second communication section 22) configured to perform wireless data communications between the mother ship and the AUV. That is, the conventional systems include sets of communication apparatuses corresponding to the types of data to be transmitted and received, and the system according to JP 2009-227086 A includes two sets of communication apparatuses. The two communication apparatuses on the AUV are disposed away from each other not to interfere with each other. The similar configuration as mentioned above applies to the two communication apparatuses on the mother ship.

Recently, small AUVs have been extensively developed. In small AUVs, two communication apparatuses cannot be disposed sufficiently away from each other. Then, transmitting and receiving two or more types of data using one set of communication apparatuses has been considered. For example, in an acoustic communication system described in JP 3-245626 A, a positioning signal is transmitted prior to a training signal for setting initial parameters of a demodulator on the reception side to eliminate the need to provide positioning apparatuses.

SUMMARY OF INVENTION

Technical Problem

In the acoustic communication system according to JP 3-245626 A, however, the positioning signal and the training signal are transmitted in one way from the transmission side to the reception side. In this system, the reception side does not return a response to the transmission side, and only detects the direction of the transmission side. Therefore, the system does not confirm whether or not the positioning signal and the training signal have been received.

It is an object of the present invention to provide an acoustic communication method and an acoustic communication system that transmit and receive two or more types of data while transmitting a response upon receipt of acoustic waves using one set of acoustic communication apparatuses (a first acoustic communication apparatus and a second acoustic communication apparatus).

It is another object of the present invention to provide an acoustic communication method and an acoustic communication system that allow the position of a second acoustic communication apparatus to be more finely grasped by increasing the number of times of positioning if a first acoustic wave includes a positioning signal for positioning the second acoustic communication apparatus relative to the first acoustic communication apparatus.

Solution to Problem

In one aspect of the present invention, there is provided an acoustic communication method of performing acoustic communications without causing collision of acoustic waves between a first acoustic communication apparatus and a second acoustic communication apparatus. In the acoustic communication method of the present invention, the first acoustic communication apparatus transmits a first acoustic wave to the second acoustic communication apparatus; the second acoustic communication apparatus transmits, upon receipt of the first acoustic wave, a second acoustic wave to the first acoustic communication apparatus continuously in constant cycles until a next first acoustic wave is received, wherein each cycle includes a transmission period and a pause period; and the first acoustic communication apparatus which has received the second acoustic wave determines, based on a time period required from transmission of the first acoustic wave till reception of the second acoustic wave and a length of the transmission period, a transmission timing that allows the next first acoustic wave to be received by the second acoustic communication apparatus in the pause period of transmission of the second acoustic wave from the second acoustic communication apparatus, and transmits the next first acoustic wave to the second acoustic communication apparatus at the transmission timing.

In this way, the second acoustic communication apparatus receives the first acoustic wave transmitted by the first acoustic communication apparatus, and the second acoustic communication apparatus continuously transmits the second acoustic wave as a response to the received first acoustic wave. A next first acoustic wave is transmitted during a pause period of the second acoustic wave. Thus, transmission and reception can be performed without causing collision between the first acoustic wave and the second acoustic wave and between the next first acoustic wave and the second acoustic wave. The "first acoustic wave" and the "next first acoustic wave" refer to acoustic waves transmitted by the first acoustic communication apparatus. The first acoustic wave and the next first acoustic wave may be based on data of either of the same type and different types. The "second acoustic wave" refers to acoustic waves transmitted by the second acoustic communication apparatus. A plurality of waves of "second acoustic wave" may be based on data of either of the same type and different types.

For example, if the first acoustic wave is based on an interrogation signal for positioning a mobile body equipped with the second acoustic communication apparatus relative to a mother ship equipped with the first acoustic communication apparatus, the second acoustic wave may be an interrogation response signal to the interrogation signal.

When the interrogation signal is utilized, the first acoustic communication apparatus can calculate the relative position of the second acoustic communication apparatus, based on the time period required from transmission of the first acoustic wave till reception of the second acoustic wave and the sound velocity in the water (about 1500 m/s). Assume that the first acoustic communication apparatus and the second acoustic communication apparatus are 3000 meters away from each other. If the first acoustic communication apparatus transmits a next first acoustic wave after reception of the interrogation response signal, it takes four or more seconds from transmission of the first acoustic wave till reception of the second acoustic wave since the sound velocity in the water is about 1500 m/s. Thus, it is not possible to finely grasp the motions of the mobile body that may move at any moment. According to the present invention, the number of times of positioning can be increased by continuously transmitting the second acoustic wave, which makes it possible to finely grasp the position of the mobile body.

The second acoustic wave is transmitted a plurality of times while the first acoustic wave is transmitted a single time. Therefore, the second and subsequent transmissions of the second acoustic wave are made after the mobile body has moved, and are temporally shifted and need correcting. The next first acoustic wave may be based on an interrogation signal, or may be based on a different signal.

The second acoustic wave and the next first acoustic wave may collide against each other, depending on the length of the transmission time of the next first acoustic wave. Thus, when the next first acoustic wave is received in the pause period, the second acoustic communication apparatus may determine, in the pause period, whether or not the next first acoustic wave and the second acoustic wave collide against each other in a next transmission period, and stop transmission of the second acoustic wave when it is determined that the next first acoustic wave and the second acoustic wave collide against each other.

If the first acoustic wave includes transmission time length information on the next first acoustic wave, the second acoustic communication apparatus may determine, based on the transmission time length information, whether or not the next first acoustic wave and the second acoustic wave collide against each other, and stop transmission of the second acoustic wave when it is determined that the next first acoustic wave and the second acoustic wave collide against each other.

With this configuration, even if the next first acoustic wave has along transmission time length, the next first acoustic wave can be reliably received by stopping transmission of the second acoustic wave.

Either of the first acoustic communication apparatus and the second acoustic communication apparatus may be mounted on any object. For example, they may be mounted on a combination of a mother ship (which is not limited to a manned ship but may be an autonomous surface vehicle (ASVs) or a buoy) and an AUV, a combination of two AUVs, and a combination of an AUV and a water bottom fixture. Further, they may be mounted on any object on the ground such as a ground fixture and a balloon. The effect of continuously transmitting the second acoustic wave is more remarkable if at least one of the first acoustic communication apparatus and the second acoustic communication apparatus is mounted on a mobile body.

As discussed above, the use environment of the method according to the present invention is not specifically limited. However, the method according to the present invention is particularly effective when the first acoustic wave and the second acoustic wave are propagated underwater.

In another aspect of the present invention, there is provided an acoustic communication system configured to perform acoustic communications without causing collision of acoustic waves between a first acoustic communication apparatus and a second acoustic communication apparatus.

The first acoustic communication apparatus includes a first signal generator, a first modulator, a first transmission timing determination section, a first transmitter, a first receiver, a first demodulator, and a first signal receiver. The first signal generator is configured to generate a first signal by converting first communication data. The first modulator is configured to modulate the first signal into a first acoustic wave signal for generating a first acoustic wave. The first transmission timing determination section is configured to determine a first transmission timing for transmitting the first acoustic wave. The first transmitter is configured to transmit the first acoustic wave to the second acoustic communication apparatus based on the first acoustic wave signal at the first transmission timing determined by the first transmission timing determination section. The first receiver is configured to receive a second acoustic wave, which has been transmitted from the second acoustic communication apparatus upon receipt of the first acoustic wave, to obtain a second acoustic wave signal. The first demodulator is configured to demodulate the second acoustic wave signal obtained by the first receiver into a second signal that can be subjected to signal processing. The first signal receiver is configured to receive the second signal and perform predetermined signal processing on the received second signal.

The second acoustic communication apparatus includes a second signal generator, a second modulator, a second transmission timing determination section, a second transmitter, a second receiver, a second demodulator, and a second signal receiver. The second signal generator is configured to generate a second signal by converting second communication data. The second modulator is configured to modulate the second signal into a second acoustic wave signal for generating a second acoustic wave. The second transmission timing determination section is configured to determine a second transmission timing for transmitting the second acoustic wave. The second transmitter is configured to transmit the second acoustic wave to the first acoustic communication apparatus based on the second acoustic wave signal at the second transmission timing determined by the second transmission timing determination section. The second receiver is configured to receive the first acoustic wave to obtain the first acoustic wave signal. The second demodulator is configured to demodulate the first acoustic wave signal obtained by the second receiver into the first signal that can be subjected to signal processing. The second signal receiver is configured to receive the first signal and perform predetermined signal processing on the received first signal.

The second transmission timing determination section determines the second transmission timing such that the second acoustic wave is transmitted continuously in constant cycles, wherein each cycle includes a transmission period in which the second acoustic wave is transmitted and a pause period in which transmission of the second acoustic wave is paused. The first transmission timing determination section determines, based on a time required from transmission of the first acoustic wave till reception of the second acoustic wave and a length of the transmission period, the first transmission timing for transmitting a next first acoustic wave such that the next first acoustic wave is received by the second acoustic communication apparatus in the pause period of the second acoustic communication apparatus.

Here again, if the length of the transmission time of the next first acoustic wave is long and the second acoustic wave and the next first acoustic wave may collide against each other, when the next first acoustic wave is received in the pause period, the second transmission timing determination section may determine, in the pause period, whether or not the next first acoustic wave and the second acoustic wave collide against each other in a next transmission period, and stop transmission of the second acoustic wave when it is determined that the next first acoustic wave and the second acoustic wave collide against each other. To "stop transmission of the second acoustic wave" means a state in which the second transmitter does not transmit acoustic waves. In digital modulation, for example, it means that transmission of carrier waves alone is also stopped.

If the first acoustic wave includes transmission time length information on the next first acoustic wave, the second transmission timing determination section may determine, based on the transmission time length information, whether or not the next first acoustic wave and the second acoustic wave collide against each other, and stop transmission of the second acoustic wave when it is determined that the next first acoustic wave and the second acoustic wave collide against each other.

Either of the first acoustic communication apparatus and the second acoustic communication apparatus may be mounted on any object. The effect of continuously transmitting the second acoustic wave is more remarkable if at least one of the first acoustic communication apparatus and the second acoustic communication apparatus is mounted on a mobile body.

The acoustic communication system according to the present invention is particularly effective when the first acoustic wave and the second acoustic wave are propagated underwater.

DESCRIPTION OF EMBODIMENTS

An acoustic communication method and an acoustic communication system according to an embodiment of the present invention will be described in detail below with reference to the accompanying drawings.

[Overall Configuration of Acoustic Communication System]

Figure 1:
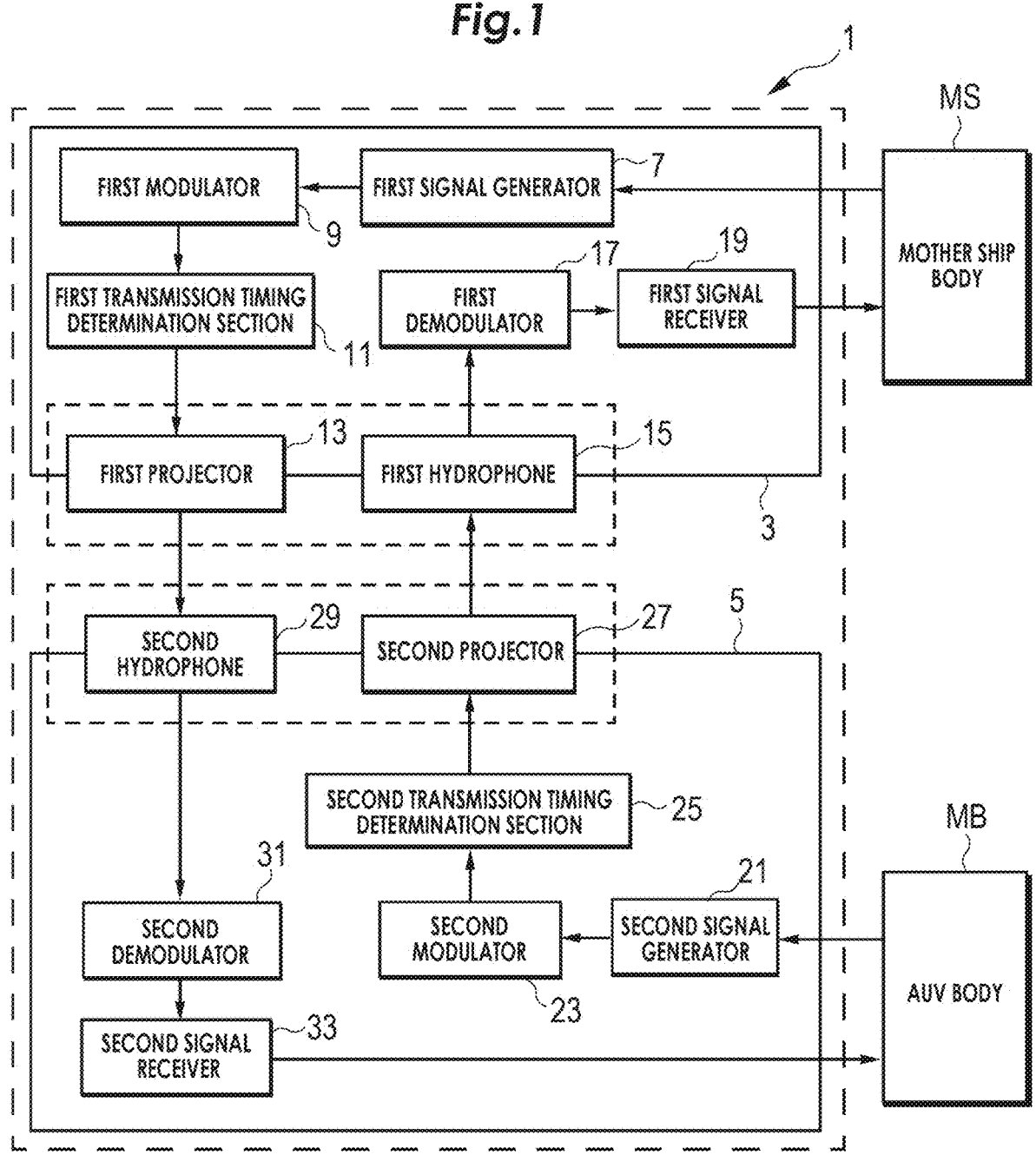
FIG. 1 is a block diagram illustrating an example acoustic communication system according to an embodiment of the present invention.

FIG. 1 is a block diagram illustrating an example acoustic communication system 1 according to an embodiment of the present invention. The acoustic communication system 1 is a communication system provided in a seabed exploration system that includes a mother ship and an AUV. The acoustic communication system 1 includes a first acoustic communication apparatus 3 mounted on the mother ship and a second acoustic communication apparatus 5 mounted on the AUV. As discussed above, the "mother ship" is not limited to a manned ship, and may be an autonomous surface vehicle (ASV) or a buoy.

The first acoustic communication apparatus 3 includes a first signal generator 7, a first modulator 9, a first transmission timing determination section 11, a first projector (transmitter) 13, a first hydrophone (receiver) 15, a first demodulator 17, and a first signal receiver 19. The second acoustic communication apparatus 5 has the same hardware configuration as the first acoustic communication apparatus 3, and includes a second signal generator 21, a second modulator 23, a second transmission timing determination section 25, a second projector (transmitter) 27, a second hydrophone (receiver) 29, a second demodulator 31, and a second signal receiver 33. The first acoustic communication apparatus 3 is mounted on a mother ship body MS to transmit/receive acoustic waves at the bottom of the mother ship body MS. The second acoustic communication apparatus 5 is mounted on a body MB of the AUV to transmit/receive acoustic waves at the body MB.

The first signal generator 7 generates a first signal by converting first communication data, which have been generated by a control apparatus in the mother ship body MS, into an electric signal according to an instruction from the control apparatus. In the embodiment, the first signal includes a plurality of types of signals such as an interrogation signal for positioning the AUV relative to the mother ship, a downlink (DL) signal for controlling navigation of the AUV, and an inverse super short baseline (ISSBL) signal for absolutely positioning or measuring the absolute position of the AUV. In the acoustic communications, only a small amount of data can be transmitted, and thus data may be encoded as necessary. An error detection/correction scheme may be incorporated in the data in case an error occurs in the data.

The first modulator 9 performs modulation on a first carrier wave, and modulates the first signal into a first acoustic wave signal for generating a first acoustic wave. A desired modulation scheme may be used. Examples of the modulation scheme include digital modulation schemes such as a phase shift keying (PSK), a frequency shift keying (FSK), and a quadrature amplitude modulation (QAM). Consequently, the first signal is modulated into the first acoustic wave signal which is suitable to generate acoustic waves to be efficiently transmitted underwater by driving the first projector 13.

The first transmission timing determination section 11 determines a first transmission timing for transmitting the first acoustic wave. The transmission timing will be discussed later.

The first projector 13 corresponds to a speaker configured to transmit the first acoustic wave to the second acoustic communication apparatus 5 based on the first acoustic wave signal at the first transmission timing determined by the first transmission timing determination section 11. The first projector 13 also includes a transmission circuit, and transmits the first acoustic wave signal with power amplification as necessary.

The first hydrophone 15 corresponds to a microphone configured to receive a second acoustic wave, which has been transmitted from the second acoustic communication apparatus 5 upon receipt of the first acoustic wave, to obtain a second acoustic wave signal. The first hydrophone 15 also includes a reception circuit, and may amplify the second acoustic wave signal and remove noise therefrom as necessary.

Projectors and hydrophones of a piezoelectric type, in which a piezoelectric ceramic vibrator is provided as a transmission element or a reception element, may be used as the projectors and the hydrophones. The piezoelectric ceramic vibrator is a material having properties to generate an electric field when pressurized and distorted and, conversely, to generate distortion or a stress when an electric field is applied. Therefore, one piezoelectric ceramic vibrator can be used both as a transmission element of the projector and as a reception element of the hydrophone. A device that uses only one piezoelectric ceramic vibrator in this way is referred to as "a transducer".

The first demodulator 17 demodulates the second acoustic wave signal obtained by the first hydrophone 15 into a second signal that can be subjected to signal processing.

The first signal receiver 19 receives the second signal, performs predetermined signal processing on the received second signal, and transmits the resulting signal to the mother ship body MS. A signal may be encoded with error correction information and transmitted as the second signal, and then error correction may be performed in the signal processing by the first signal receiver 19. If the signal has been encoded, data expansion is also performed.

The second signal generator 21 generates a second signal by converting second communication data according to an instruction from a control apparatus installed in the body MB of the AUV. The second signal includes an interrogation response signal, which is a response to the interrogation signal transmitted from the first acoustic communication apparatus 3, and an uplink (UL) signal such as positioning data.

The second modulator 23 performs modulation on a second carrier wave, and modulates the second signal into a second acoustic wave signal for generating a second acoustic wave. As with the first modulator 9, a desired modulation scheme may be used. The modulation scheme may be digital modulation schemes such as the PSK, the FSK, and the QAM. The second transmission timing determination section 25 determines a second transmission timing for transmitting the second acoustic wave. The second projector 27 transmits the second acoustic wave to the first acoustic communication apparatus 3 based on the second acoustic wave signal at the second transmission timing determined by the second transmission timing determination section 25. The second hydrophone 29 receives the first acoustic wave to obtain the first acoustic wave signal. The second demodulator 31 demodulates the first acoustic wave signal obtained by the second hydrophone 29 into a first signal that can be subjected to signal processing. The second signal receiver 33 receives the first signal, performs predetermined signal processing on the received first signal, and transmits the resulting signal to the body MB of the AUV.

[Communications Using Acoustic Communication System]

Figure 2:
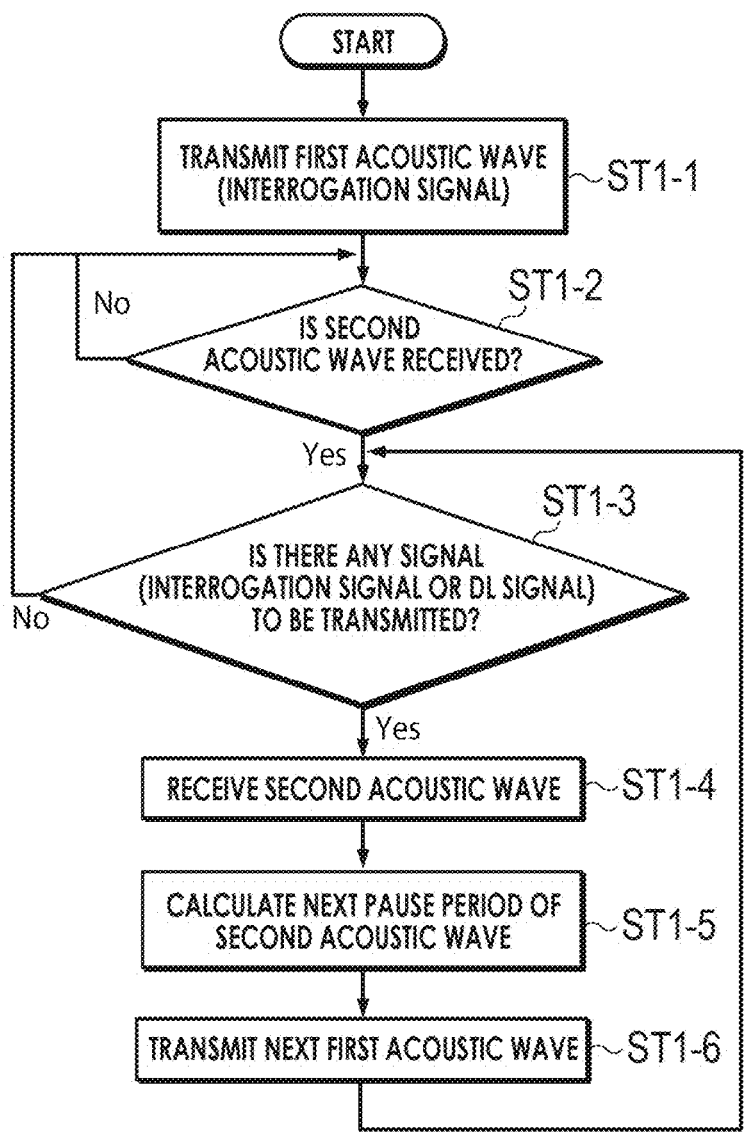
FIG. 2 is a flowchart illustrating an example operation of a first acoustic communication apparatus.
Figure 3:
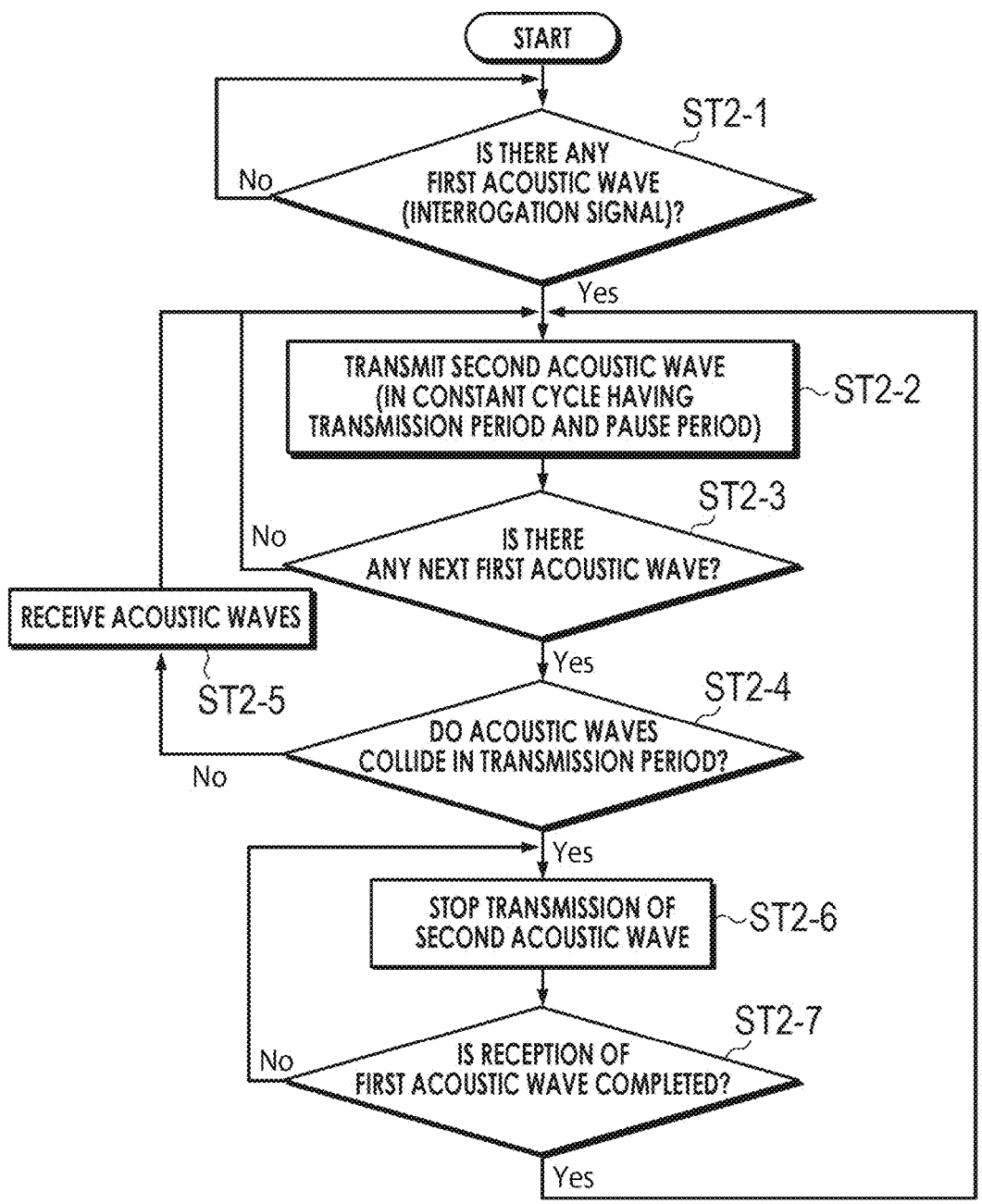
FIG. 3 is a flowchart illustrating an example operation of a second acoustic communication apparatus.
Figure 4:
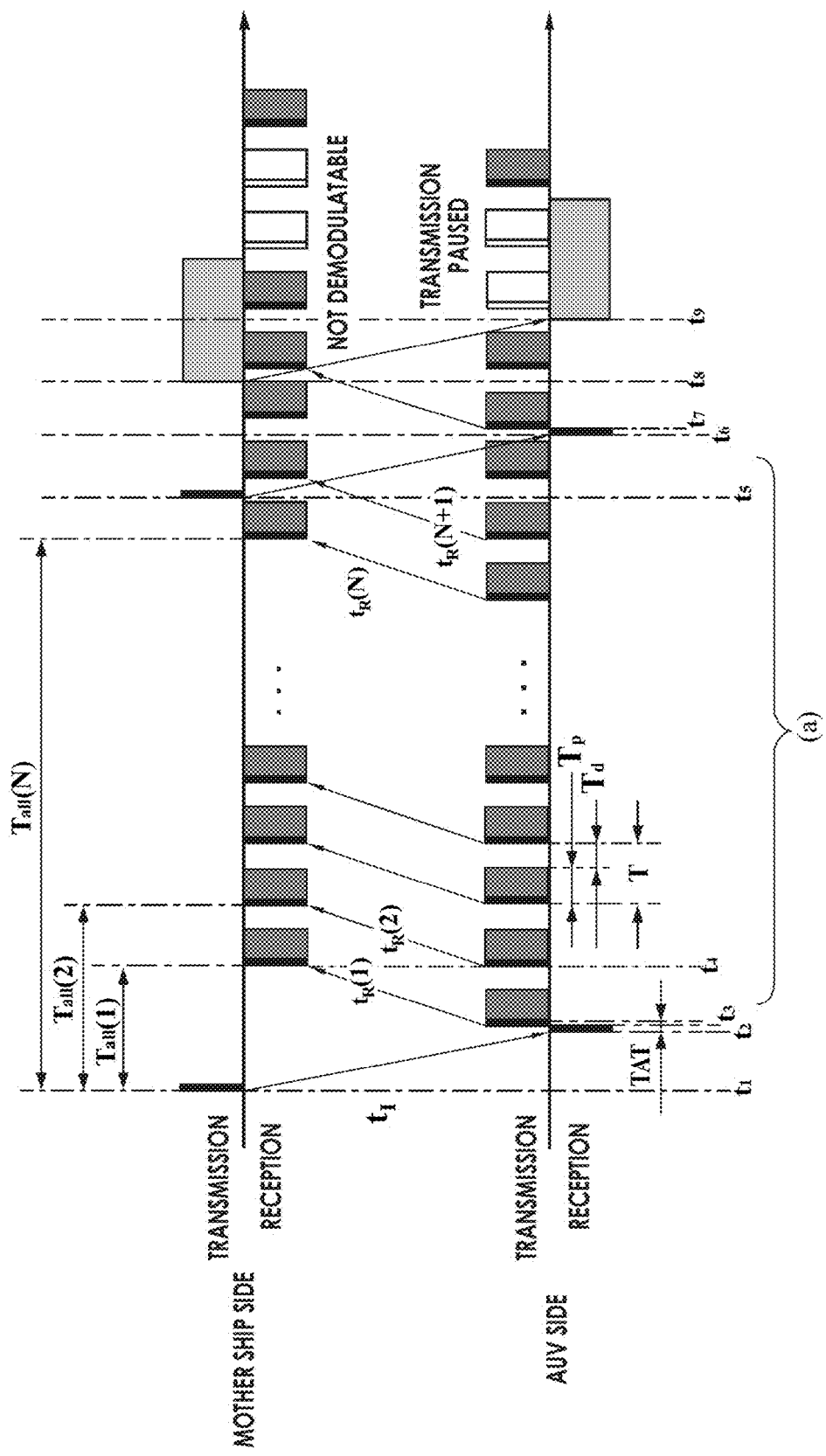
FIG. 4 is a time chart illustrating an example communication performed by the acoustic communication system.

The acoustic communication method according to the embodiment will be described with reference to FIGS. 2 to 4. FIG. 2 is a flowchart illustrating an example operation of the first acoustic communication apparatus (mother ship side). FIG. 3 is a flowchart illustrating an example operation of the second acoustic communication apparatus (AUV side). FIG. 4 is a time chart illustrating an example communication. FIG. 4 is divided into a time chart on the mother ship side and a time chart on the AUV side, in each of which transmission and reception are indicated on the upper side and the lower side, respectively. For convenience of description, FIG. 4 is not a time chart of transmission and reception of acoustic waves, but illustrates the transmission using the transmission timing determined by the first transmission timing determination section 11 and the second transmission timing determination section 25, and the reception using the timing when the first acoustic wave signal and the second acoustic wave signal are received.

First, the first acoustic communication apparatus 3 transmits a first acoustic wave based on a first signal at a desired time t1 determined by the first transmission timing determination section 11 (step ST1-1). In the embodiment, the first acoustic wave is based on the first signal which is an interrogation signal. When the second acoustic communication apparatus 5 receives the first acoustic wave at time t2 (step ST2-1), the second acoustic communication apparatus 5 transmits a second acoustic wave (which is based on a second signal that includes a combination of an interrogation response signal and an UL signal) at time t3 upon receipt of the first acoustic wave (step ST2-2). When the first communication apparatus 3 receives the second acoustic wave at time t4 (step ST1-2), the first acoustic communication apparatus 3 determines whether or not there is any next first signal to be transmitted (step ST1-3). In the example illustrated in FIG. 4, it is determined a plurality of times whether or not there is no next first signal to be transmitted, a plurality of second acoustic waves are received without transmitting a first acoustic wave. The second acoustic wave is transmitted continuously in constant cycles, as indicated in period (a) of FIG. 4, until a next first acoustic wave is received. Each cycle T includes a transmission period Tp and a pause period Td. If the position of the second acoustic communication apparatus 5 relative to the first acoustic communication apparatus 3 is calculated each time a second acoustic wave is received, the number of times of positioning can be increased, which makes it possible to know the position of the mobile body more finely. Even during the transmission period Tp, the pause period Td may be seemingly extended, for example, by including the same data as the one indicating the pause period in the second signal.

If the first acoustic communication apparatus 3 determines in step ST1-3 that there is any next first signal to be transmitted, the first acoustic communication apparatus 3 receives the second acoustic wave (step ST1-4), and computes a next pause period Td of the second acoustic wave (step ST1-5) while receiving the second acoustic wave. That is, in order to transmit a next first acoustic wave such that the next first acoustic wave does not coincide with the transmission period Tp of the second acoustic wave which is transmitted continuously in constant cycles, the first transmission timing determination section 11 computes a next pause period Td of the second acoustic wave based on the time period required from transmission of the first acoustic wave till reception of the second acoustic wave and the length of the transmission period Tp, and determines the transmission timing such that the next first acoustic wave reaches the second acoustic communication apparatus 5 in the computed pause period. The first acoustic communication apparatus 3 transmits a first acoustic wave based on a next first signal at time t5 determined by the first transmission timing determination section 11 (step ST1-6). When the second acoustic communication apparatus 5 receives the next first acoustic wave at time t6 (step ST2-3), the second acoustic communication apparatus 5 determines, based on transmission time length information included in a header information portion of the next first acoustic wave, whether or not the next first acoustic wave and the second acoustic wave collide against each other in the next transmission period Tp (step ST2-4). If it is determined that the next first acoustic wave and the second acoustic wave do not collide against each other, the second acoustic communication apparatus 5 continues to receive the next first acoustic wave (step ST2-5). For example, the first acoustic wave received at time t6 does not collide against a second acoustic wave, and therefore is received. Since the first acoustic wave transmitted at time t5 is based on the first signal which is an interrogation signal, a second acoustic wave (which is based on the second signal that includes an interrogation response signal and an UL signal) is transmitted at time t7 upon receipt of the new first acoustic wave. Therefore, this pause period is shorter than the pause period Td.

If it is determined in step ST2-4 that the next first acoustic wave and the second acoustic wave collide against each other, the second transmission timing determination section 25 of the second acoustic communication apparatus 5 stops transmission of the second acoustic wave while the next first acoustic wave is being received. For example, the next first acoustic wave transmitted at time t8 is based on a DL signal (or an ISSBL signal), has a large amount of data compared to an interrogation signal, and therefore is transmitted over a longer time period. Therefore, the second acoustic communication apparatus 5 determines that the first acoustic wave received at time t9 collides against a second acoustic wave, and stops transmission of the second acoustic wave until reception of the first acoustic wave is completed. In this example, transmission of the second acoustic wave is paused for a time period corresponding to two waves. In FIG. 4, the signal is illustrated in outline to indicate that signal transmission is paused. When using the digital modulation such as the PSK, the FSK, and the QAM schemes, transmission of carrier waves alone is also stopped and the second projector 27 is in a state of transmitting no acoustic waves while transmission of the second acoustic wave is stopped. The first acoustic communication apparatus 3 receives two second acoustic waves while acoustic waves based on a DL signal (or an ISSBL signal) are being transmitted. The two second acoustic waves cannot be demodulated by the first acoustic communication apparatus 3.

[Computation of Position of Second Acoustic Communication Apparatus Relative to First Acoustic Communication Apparatus]

This section will describe computation of the position of the second acoustic communication apparatus 5 relative to the first acoustic communication apparatus 3 based on an interrogation signal and an interrogation response signal to the interrogation signal.

Parameters used in FIG. 4 are defined as follows:

$t_I$: a time period required for the first acoustic wave to reach the second acoustic communication apparatus 5 from the first acoustic communication apparatus 3;

TAT: a turnaround time (a time period required from reception of the first acoustic wave till transmission of an initial second acoustic wave from the second acoustic communication apparatus 5);

$t_R(n)$: a time period required for the n-th second acoustic wave to reach the first acoustic communication apparatus 3; and T: transmission period Tp+pause period Td of the second acoustic wave.

Then, a time $T_{all}(n)$ required from transmission of the first acoustic wave which is based on an interrogation signal till return of the second acoustic wave which is based on an n-th interrogation response signal is represented by the following expression:

$$T_{all}(n)=t_I+TAT+(n-1)*T+t_R(n).$$

For the initial second acoustic wave (n=1), the following expression is used:

$$T_{all}(1)=t_I+TAT+t_R(1).$$

Assuming $t_I=t_R(1)$, $t_I$ and $t_R(1)$ are obtained by the following expression:

$$t_I=t_R(1)=(T_{all}(1)-TAT)/2$$

Thus, when $t_I$ or $t_R(1)$ is multiplied by the propagation velocity (about 1500 m/s) of acoustic waves travelling underwater, the relative distance between the first acoustic communication apparatus 3 and the second acoustic communication apparatus 5 at that moment is obtained.

For subsequent second acoustic waves (n>1), the following formula is used:

$$t_R(n)=T_{all}(n)-t_I-TAT-(n-1)*T.$$

When $t_R(n)$ which is obtained by the above expression is multiplied by the propagation velocity (about 1500 m/s) of acoustic waves travelling underwater, the relative distance between the first acoustic communication apparatus 3 and the second acoustic communication apparatus 5 at that moment is obtained.

The method of obtaining the direction of the second acoustic communication apparatus 5 with respect to the first acoustic communication apparatus 3 is not discussed in detail herein. When the first and second hydrophones 15 and 29 are formed using arrays in which a plurality of reception elements are arranged to receive acoustic waves transmitted in all directions from a projector, the direction of the second acoustic communication apparatus can be obtained on the reception side, based on the difference in the received acoustic waves in the reception elements.

The position of the second acoustic communication apparatus 5 relative to the first acoustic communication apparatus 3 can be obtained according to the relative distance and the direction obtained in this way.

While an embodiment of the present invention has been specifically described above, the present invention is not limited to such an embodiment, and it is a matter of course that changes, modifications, or variations may be made within the scope of the technical concept of the present invention.

In the embodiment described above, for example, the possibility of collision between the acoustic waves is determined based on the transmission time length information included in the header information portion of the next first signal. However, transmission time length information on the next first acoustic wave may be included in the preceding first acoustic wave, and it may be determined based on the transmission time length information whether or not the next first acoustic wave and the second acoustic wave collide against each other.

The embodiment described above is a communication system provided in a seabed exploration system that includes a mother ship and an AUV. However, the present invention is applicable to a combination of AUVs, a combination of an AUV and a water bottom fixture, etc. and furthermore to combinations on the ground such as a ground fixture and a balloon.

INDUSTRIAL APPLICABILITY

According to the present invention, it is possible to provide an acoustic communication method and an acoustic communication system that transmit and receive two or more types of data while transmitting a response upon receipt of acoustic waves using one set of acoustic communication apparatuses (a first acoustic communication apparatus and a second acoustic communication apparatus).

What is claimed is:

1. An acoustic communication method of performing acoustic communications without causing collision of acoustic waves between a first acoustic communication apparatus and a second acoustic communication apparatus, the method comprising:
   the first acoustic communication apparatus transmitting a first acoustic wave to the second acoustic communication apparatus;
   the second acoustic communication apparatus transmitting, upon receipt of the first acoustic wave, a second acoustic wave to the first acoustic communication apparatus continuously in constant cycles until a next first acoustic wave is received, each cycle including a transmission period in which the second acoustic wave is transmitted and a pause period in which transmission of the second acoustic wave is paused; and
   the first acoustic communication apparatus which has received the second acoustic wave determining, based on a time period required from transmission of the first acoustic wave till reception of the second acoustic wave and a length of the transmission period, a transmission timing that allows the next first acoustic wave to be received by the second acoustic communication apparatus in the pause period of transmission of the second acoustic wave from the second acoustic communication apparatus, and transmitting the next first acoustic wave to the second acoustic communication apparatus at the transmission timing.

2. The acoustic communication method according to claim 1, wherein:
   when the next first acoustic wave is received in the pause period, the second acoustic communication apparatus determines, in the pause period, whether or not the next first acoustic wave and the second acoustic wave collide against each other in a next transmission period, and stops transmission of the second acoustic wave when it is determined that the next first acoustic wave and the second acoustic wave collide against each other.

3. The acoustic communication method according to claim 1, wherein:
   the first acoustic wave includes transmission time length information on the next first acoustic wave; and
   the second acoustic communication apparatus determines, based on the transmission time length information, whether or not the next first acoustic wave and the second acoustic wave collide against each other, and stops transmission of the second acoustic wave when it is determined that the next first acoustic wave and the second acoustic wave collide against each other.

4. The acoustic communication method according to claim 1, wherein
   at least one of the first acoustic communication apparatus and the second acoustic communication apparatus is mounted on a mobile body.

5. The acoustic communication method according to claim 1, wherein
   the first acoustic wave and the second acoustic wave are propagated underwater.

6. An acoustic communication system configured to perform acoustic communications without causing collision of acoustic waves between a first acoustic communication apparatus and a second acoustic communication apparatus, the system comprising:
   the first acoustic communication apparatus including:
      a first signal generator configured to generate a first signal by converting first communication data,
      a first modulator configured to modulate the first signal into a first acoustic wave signal for generating a first acoustic wave,
      a first transmission timing determination section configured to determine a first transmission timing for transmitting the first acoustic wave,
      a first transmitter configured to transmit the first acoustic wave to the second acoustic communication apparatus based on the first acoustic wave signal at the first transmission timing determined by the first transmission timing determination section,
      a first receiver configured to receive a second acoustic wave, which has been transmitted from the second acoustic communication apparatus upon receipt of the first acoustic wave, to obtain a second acoustic wave signal,
      a first demodulator configured to demodulate the second acoustic wave signal obtained by the first receiver into a second signal that can be subjected to signal processing, and
      a first signal receiver configured to receive the second signal and perform predetermined signal processing on the received second signal;
   the second acoustic communication apparatus including:
      a second signal generator configured to generate a second signal by converting second communication data,
      a second modulator configured to modulate the second signal into a second acoustic wave signal for generating a second acoustic wave,
      a second transmission timing determination section configured to determine a second transmission timing for transmitting the second acoustic wave,
      a second transmitter configured to transmit the second acoustic wave to the first acoustic communication apparatus based on the second acoustic wave signal at the second transmission timing determined by the second transmission timing determination section,
      a second receiver configured to receive the first acoustic wave to obtain the first acoustic wave signal,
      a second demodulator configured to demodulate the first acoustic wave signal obtained by the second receiver into the first signal that can be subjected to signal processing, and
      a second signal receiver configured to receive the first signal and perform predetermined signal processing on the received first signal, wherein:
   the second transmission timing determination section determines the second transmission timing such that the second acoustic wave is transmitted continuously in constant cycles, each cycle including a transmission period in which the second acoustic wave is transmitted and a pause period in which transmission of the second acoustic wave is paused; and
   the first transmission timing determination section determines, based on a time required from transmission of the first acoustic wave till reception of the second acoustic wave and a length of the transmission period, the first transmission timing for transmitting a next first acoustic wave such that the next first acoustic wave is received by the second acoustic communication apparatus in the pause period of the second acoustic communication apparatus.

7. The acoustic communication system according to claim 6, wherein
when the next first acoustic wave is received in the pause period, the second transmission timing determination section determines, in the pause period, whether or not the next first acoustic wave and the second acoustic wave collide against each other in a next transmission period, and stops transmission of the second acoustic wave when it is determined that the next first acoustic wave and the second acoustic wave collide against each other.

8. The acoustic communication system according to claim 6, wherein:
the first acoustic wave includes transmission time length information on the next first acoustic wave; and
the second transmission timing determination section determines, based on the transmission time length information, whether or not the next first acoustic wave and the second acoustic wave collide against each other, and stops transmission of the second acoustic wave when it is determined that the next first acoustic wave and the second acoustic wave collide against each other.

9. The acoustic communication system according to claim 6, wherein
at least one of the first acoustic communication apparatus and the second acoustic communication apparatus is mounted on a mobile body.

10. The acoustic communication system according to claim 6, wherein
the first acoustic wave and the second acoustic wave are propagated underwater.

11. The acoustic communication method according to claim 2, wherein
the first acoustic wave and the second acoustic wave are propagated underwater.

12. The acoustic communication method according to claim 3, wherein
the first acoustic wave and the second acoustic wave are propagated underwater.

13. The acoustic communication method according to claim 4, wherein
the first acoustic wave and the second acoustic wave are propagated underwater.

14. The acoustic communication system according to claim 7, wherein
the first acoustic wave and the second acoustic wave are propagated underwater.

15. The acoustic communication system according to claim 8, wherein
the first acoustic wave and the second acoustic wave are propagated underwater.

16. The acoustic communication system according to claim 9, wherein
the first acoustic wave and the second acoustic wave are propagated underwater.

\* \* \* \* \*